United States Patent [19]

Deribas et al.

[11] 3,735,476

[45] May 29, 1973

[54] METHOD OF MANUFACTURING COMPONENTS WITH CAVITIES BY EXPLOSIVE WELDING OF METAL BLANKS

[76] Inventors: Andrei Andreevich Deribas, ulitsa Pravdy, 1, kv. 20, Novosibirsk; Vladimir Mikhailovich Kudinov, ulitsa Filatova, 1/22, kv. 51, Kiev; Felix Iovich Matveenkov, ulitsa Pravdy, 1, kv. 24, Novosibirsk; Vladimir Ivanovich Oksak, Basseinaya ulitsa, 8, kv. 4, Kiev; Valery Alexandrovich Simonov, bulvar Molodezhi, 30, kv. 19, Novosibirsk; Nikolai Gerasimovich Ostapenko, deceased, late of Kiev; Klara Mikhailovna Ivanova, administrator, bulvar Lesi ukrainki, 2, kv. 20, Kiev; Alexei Nikolaevich Ostapenko, administrator, ulitsa Molodezhnaya, 4, kv. 220, Moscow, all of U.S.S.R.

[22] Filed: Jan. 29, 1970

[21] Appl. No.: 6,797

[52] U.S. Cl. ...................29/470.1, 29/423, 29/481
[51] Int. Cl. ..................................B23k 21/00

[58] Field of Search ..............29/470.1, 486, 421 E, 29/470.9, 423, 497.5, 481, 557

[56] References Cited

UNITED STATES PATENTS

| | | | |
|---|---|---|---|
| 2,982,012 | 5/1961 | Wilkins et al. | 29/470.9 X |
| 2,986,810 | 6/1961 | Brick | 29/423 |
| 3,044,160 | 7/1962 | Jaffee | 29/423 |
| 3,106,014 | 10/1963 | Brick et al. | 29/470.9 |
| 3,135,044 | 6/1964 | Mote, Jr. et al. | 29/423 |
| 3,201,858 | 8/1965 | Volyi | 29/423 UX |
| 3,419,951 | 1/1969 | Carlson | 29/486 X |
| 3,474,520 | 10/1969 | Tokizawa | 29/470.1 |
| 3,543,388 | 12/1970 | Blank et al. | 29/486 |
| 3,264,731 | 8/1966 | Chudzik | 29/486 |

*Primary Examiner*—John F. Campbell
*Assistant Examiner*—Ronald J. Shore
*Attorney*—Waters, Roditi, Schwartz and Nissen

[57] ABSTRACT

A method of manufacturing multilayer components with inner hollows by the explosive welding of metal blanks, one of the blanks being provided with depressions filled with fusible or soluble materials which are removed after welding.

3 Claims, 5 Drawing Figures

METHOD OF MANUFACTURING COMPONENTS WITH CAVITIES BY EXPLOSIVE WELDING OF METAL BLANKS

The present invention relates to welding practices, and more particularly to methods of producing components with inner cavities by the explosive welding of metal blanks, said components being employed, for example, in various branches of the machine-building industry.

Cooled walls of molds in continuous steel casting plants, walls of jet engine nozzles and so forth may be referred to as examples of components of the aforementioned type.

At present, the above indicated components are made by joining two blanks with the aid of conventional methods involving the use of bolted joints, brazing, resistance welding and so forth, which, as a rule, do not provide high-strength joints and do not insure sufficient air tightness thereof. In addition, the prior-art methods involve much labor.

Attempts have also been made to use prior-art methods of explosive welding to obtain metal components with cavities. However, until recently such attempts proved to be unsuccessful.

The difficulty in producing parts with cavities lies in the fact that only certain areas of the blanks should be welded together, as well as in the fact that the impact of the plate to be welded on against the base plate causes destruction of the plate to be welded on, which is due to the latter's partially entering depressions made in the surface of the base plate as a result of which airtightness of the produced component is not secured. Further, after the blanks are joined together, inner cavities of intricate shape can not be made with any of the conventional methods.

An object of the present invention is to provide a simple and reliable method of producing components with inner cavities by the explosive welding of metal blanks. Another object of the present invention is to eliminate labor-consuming operations in the production of components with inner cavities.

A further object is to make available components with a quality weld and with cavities of various configurations.

In accordance with the above-mentioned and other objects, the invention consists in that in the method of producing components with inner hollows by means of the explosive welding of metal blanks according to the invention, that are made in at least one welding surface of a base blank depressions to be then filled with a lower-melting metal, for instance tin, and then there is joined to the welding surface of the base blank by explosive welding at least one blank to be welded on, after which the low-melting metal is fused out from the thusly formed hollows of the produced component.

In another method of producing components with inner hollows by the explosive welding of metal blanks according to the invention, there are made in at least one welding surface of the base blank depressions to be then filled with a soluble material, for instance sodium chloride, and then there is joined to the welding surface of the base blank by explosive welding at least one blank to be welded on, after which the soluble material is removed from the thusly formed hollows of the manufactured component.

It is preferred that a thinner blank should be first welded, by the explosive method, to at least one welding surface of the base blank with the filled depressions.

Other objects and advantages of the present invention will become more fully apparent from a consideration of the following description, taken in conjunction with the accompanying drawings, in which.

In disclosing the following embodiments of the invention shown in the accompanying drawings, specific terminology is used for the sake of clarity. However, the concise terms employed therein should not be regarded as in any way limiting the invention, and it should be borne in mind that each such term comprehends all possible equivalent members working in a similar way and which can be employed to solve the same problems.

Production of components with hollows by the explosive welding of metal blanks according to the invention is carried into effect as follows.

Figure 1:
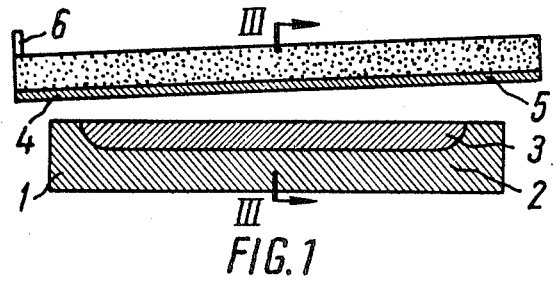
FIG. 1 shows diagrammatically, according to the invention, a base metal blank provided with depressions filled by a low-melting metal or a soluble material, and the blank to be welded-on with an explosive charge placed thereon (there being shown a longitudinal section across one of the depressions).
Figure 3:
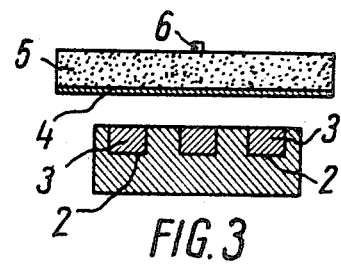
FIG. 3 is a sectional view along section line III—III in FIG. 1.
Figure 2:
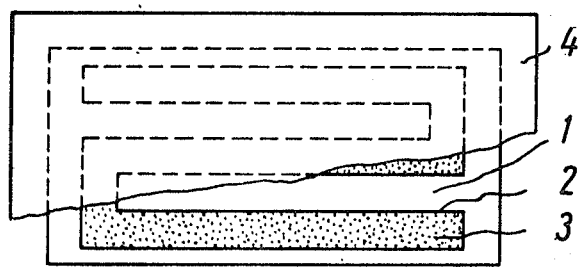
FIG. 2 is a top view of the arrangement of FIG. 1 without the charge, the blank to be welded-on being partially cut away.
Figure 4:
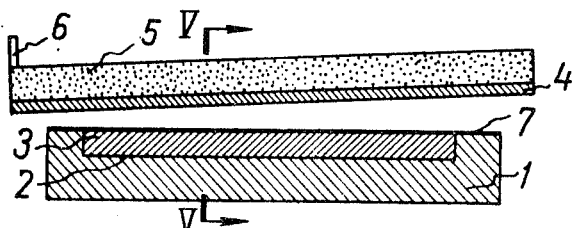
FIG. 4 shows a smaller arrangement with a thinner metal blank pre-welded by the explosive method (there being shown a longitudinal section across one of the depressions)
Figure 5:
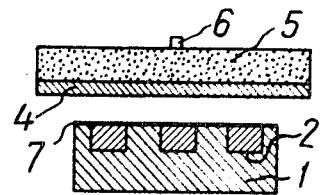
FIG. 5 is a cross-sectional view along section line V—V in FIG. 4.

Made by one of the conventional methods, say machining, on the welding surface of the base blank 1 (FIGS. 1–5) are depressions 2 of a required configuration conforming to the shape and dimensions of the desired cavities. Depressions 2 are filled with a low-melting metal 3, say tin, or a soluble material 3, say sodium chloride, after which at least one blank 4 to be welded on is joined to the welding surface of base blank 1 by explosive method. Welding is effected by initiating the detonation of an explosive charge 5 placed on a blank 4 to be welded on, detonator 6 effecting the initiation. The low-melting metal or soluble material is then removed from the formed hollows of the manufactured component by fusing or dissolving the same. The thusly welded component is then subjected to further working.

Impact of blank 4 to be welded on against base blank 1, having depressions 2, produces a firm joint. The low-melting metal or soluble material filling depressions 2, and the metal of blank 4 to be welded on do not weld together at all or form a weak joint which is readily destroyed by fusion or dissolving.

To exclude the possibility of breaking blank 4 to be welded on, and to improve the weld quality, a thinner metal blank 7 (FIGS. 4 and 5) can be first welded, by the explosive method, to the welding surface of base blank 1 with filled depressions 2, said thinner blank firmly welding, during the impact, with the metal of base blank 1. The low-melting metal or soluble material filling depressions 2, and blank 7 do not weld together at all, or form a weak joint. At least one blank 4 to be welded on is then explosion-welded to the surface of the metal blank 7.

The explosive charge 5 can be set off not only by detonator 6, but by a detonating cord or a plane-wave generator (not shown in the drawings) as well. The place of initiation is chosen according to the shape of depressions 2, so that the front of detonation can spread along the principal directions of the depressions.

According to the invention, several blanks 4 can be simultaneously welded to base blank 1. In case several blanks 4 are welded to base blank 1 on one side thereof, the explosive charge 5 is placed only on the furthermost blank 4 with respect to base blank 1. When one or several blanks 4 are required to be welded to base blank 1 on both sides thereof, explosive charges 5 are located on the extreme blanks 4 to be welded on. In the latter case, either separate depressions 2 are formed on each welding surface of base blank 1, or through recesses are made in this blank.

Manufacturing of components with inner cavities by the explosive welding of metal blanks according to this invention has the following advantages:

filling the depressions made in the base blank with a low-melting metal or a soluble material and subsequent welding of at least one blank to the said base blank permits components with inner cavities of various configurations to be obtained, using a wide combination of metals in the initial blanks and insuring a quality joint therebetween; additionally, the consumption of labor and of scarce materials used in the production of components with inner hollows is greatly decreased.

This method has been effectively used to manufacture a bimetalic cooled wall of the mold for a continuous steel casting machine.

Though the present invention is disclosed in connection with its preferred embodiment, it is obvious that there may be many modifications and variants thereof that do not depart from the idea and scope of the invention which will be easily understood by those skilled in the art. These modifications and variants are considered to fall within the essence and scope of the invention as defined by the appended claims.

What we claim is:

1. A method of manufacturing components with inner hollows by the explosive welding of metal blanks, said method comprising forming in at least one welding surface of a base blank depressions which are then filled with a removable material, welding to the base blank to cover said material and enclose the same in said depressions a relatively thin second blank, welding over the relatively thin second blank by an explosive welding technique at least one further blank, and then removing said material from the thusly formed hollows of the composite structure.

2. A method as claimed in claim 1 wherein the material is fusible.

3. A method as claimed in claim 1 wherein the material is soluble.

* * * * *